No. 830,135. PATENTED SEPT. 4, 1906.
C. A. CORMAN.
SUPPORTING BRACKET FOR CURTAIN AND OTHER ROLLERS.
APPLICATION FILED APR. 5, 1906.
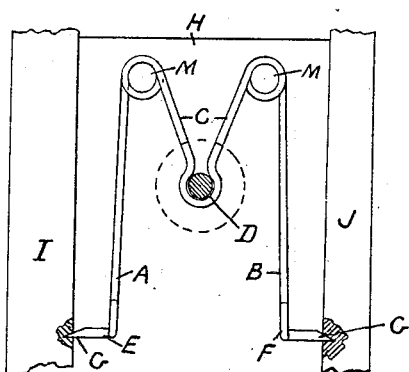
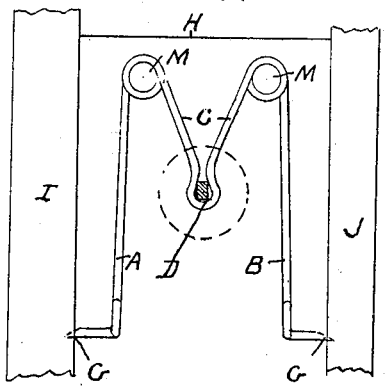
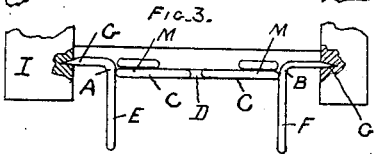
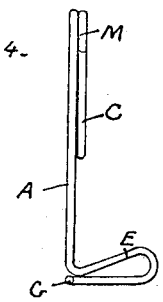
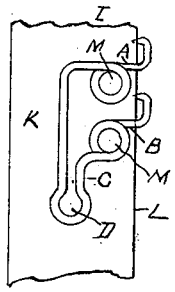
WITNESSES.
Charles K. Brown
Sumner B. Robinson
INVENTOR.
CHARLES A. CORMAN
BY
Albert W. Brown.
ATTORNEY.

UNITED STATES PATENT OFFICE.

CHARLES A. CORMAN, OF BOSTON, MASSACHUSETTS.

SUPPORTING-BRACKET FOR CURTAIN AND OTHER ROLLERS.

No. 830,135.  Specification of Letters Patent.  Patented Sept. 4, 1906.

Application filed April 5, 1906. Serial No. 310,146.

*To all whom it may concern:*

Be it known that I, CHARLES A. CORMAN, a citizen of the United States, residing at the city of Boston, in the county of Suffolk and State of Massachusetts, have invented new and useful Improvements in Supporting-Brackets for Curtain and other Rollers, of which the following is a specification.

This invention relates to the supporting-brackets for curtain and other such like rollers.

The bracket of this invention in substance is composed of two legs or arms each adapted in its length for engaging, or other suitable holding contact, with the window or other frame, in combination with means making a connection between or of said arms or legs and adapted and suitable to act to force and hold said arms or legs in their said contact and to allow them to be readily released and having an opening or socket suitably shaped to receive and make a bearing for the pintle or axial pin or spindle projecting from an end of the roller or for the end of the roller itself, and, again and as the most preferable construction of the bracket aforesaid and which of itself constitutes a feature of this invention, the bracket aforesaid is made of a continuous length of wire with its opposite ends adapted for an engaging or holding contact, such as stated, and between said opposite ends coiled at two points, so as thereby to impart a spring or resilient action to each leg thereof and in each instance in an outward direction from the other, and between said coils and in continuation therefrom formed with a downward-extending pendent section or hanger, which has a socket or opening suitable to receive and support an axial pintle or pin or spindle projecting from the end of a curtain or other roller or to receive the end of the roller itself, all substantially as hereinafter described.

In the accompanying drawings, forming part of this specification, Figures 1 to 4, both inclusive, and Fig. 5 are views in illustration of the most preferable form of construction of the roller-bracket support as has been hereinbefore stated. Figs. 1 and 2 are similar front or face views of the opposite end brackets for the support of a spring curtain-roller, such as the Hartshorn, and in each view a sufficient portion of a window-casing is shown in elevation. Fig. 3 is a plan view, and Fig. 4 is an edge elevation, of the bracket, Fig. 1. Fig. 5 is a front or face view showing a modification from the form, Figs. 1 to 4, and as will hereinafter fully appear.

In the drawings, A and B are the two legs or arms, and C is the intermediate downward extension or hanger, either in continuation thereof or joined therewith and having a socket or opening D, which is of suitable shape to receive and properly support a curtain-roller of the character before mentioned or other roller.

As particularly shown, Figs. 1, 2, 3, 4, and 5, the legs A and B and the hanger C are severally continuous with each other and made of a single length of wire, preferably stiff, which has each of its opposite end portions E F doubled upon itself and the free end G thereof pointed, so that it can be entered into the woodwork of a window-casing H, as shown, for supporting the parts described in place on the casing, and either between and on an inside bead I and the parting-bead J thereof, as shown, Figs. 1 and 2, or on the front face K of the inside bead I, by engaging the pointed ends of the legs A and B with the inner edge L of said inside bead, as shown, Fig. 5.

Between each of the opposite legs or arms A and B and the hanger C, Figs. 1, 2, 3, 4, and 5, the wire length has a coil M to impart a spring and resilient action to the legs or arms, and thereby to enable them to be the better engaged with and disengaged from the window-casing, as has been described, as also to secure a tightening of the hold of the bracket on the window-frame in the working of the curtain—as, for instance, from a downward pull upon the curtain close it.

The difference between the bracket Fig. 5 as compared with the brackets Figs. 1, 2, 3, and 4 is plainly discernible from the drawings and consists only in the bend of the legs as to each other to accommodate their pointed ends for engagement with the edge of an inner bead I and to present the hanger C at the face of said bead I instead of between that bead and the parting-bead J of the window-frame.

The legs A and B of the bracket may be adapted for frictional contact only with the window-casing; but it is preferable to adapt them so as to actually engage with the casing.

The roller may be made of wood or of metal or of paper, in the latter case suitably forming it for the purpose.

Having thus described my invention, what I claim, and desire to secure by Letters Patent, is—

A roller-bracket, consisting of a wire bent upon itself, intermediate of its length, to form a bearing for one end of a roller, and then its two lengths diverging therefrom and each formed with an intermediate coil and their remainders extended in substantially parallel directions and at opposite sides of said roller-bearing, and their extreme end portions suitably bent to form outward side-projecting prongs to be engaged at opposite points of a suitable supporting-frame, substantially as described.

In witness whereof I have hereunto set my hand in the presence of two subscribing witnesses.

CHARLES A. CORMAN.

Witnesses:
ALBERT W. BROWN,
L. W. HOWES.